United States Patent [19]

Szatkowski et al.

[11] Patent Number: 5,613,141
[45] Date of Patent: Mar. 18, 1997

[54] DATA STORAGE SUBSYSTEM HAVING DEDICATED LINKS CONNECTING A HOST ADAPTER, CONTROLLER AND DIRECT ACCESS STORAGE DEVICES

[75] Inventors: Michael J. Szatkowski, Brockenhurst; Ian D. Judd, Otterbourne, both of United Kingdom

[73] Assignee: International Business Machines Corporation, Armonk, N.Y.

[21] Appl. No.: 375,099

[22] Filed: Jan. 19, 1995

Related U.S. Application Data

[63] Continuation of Ser. No. 938,056, filed as PCT/GB91/00254, Feb. 19, 1991, abandoned.

[51] Int. Cl.$^6$ ..................................... G06F 13/00
[52] U.S. Cl. .................. 395/800; 395/841; 395/439; 364/283.3; 364/242.3; 364/243.2; 364/DIG. 1
[58] Field of Search .............. 395/200.08, 200.13, 395/200.15, 827, 842, 851, 853, 309, 311, 439, 182.07, 800, 841; 370/54, 85.13, 94.1, 95.1; 340/825.03, 826, 825.06

[56] References Cited

U.S. PATENT DOCUMENTS

| | | | |
|---|---|---|---|
| 4,454,595 | 6/1984 | Cage | 395/425 |
| 4,607,346 | 8/1986 | Hill | 395/425 |
| 4,751,634 | 6/1988 | Burrus, Jr. et al. | 395/883 |
| 5,051,887 | 9/1991 | Berger et al. | 395/425 |
| 5,111,425 | 5/1992 | Takeuchi et al. | 395/842 |
| 5,131,082 | 7/1992 | Bonevento et al. | 395/275 |
| 5,155,845 | 10/1992 | Beal et al. | 395/575 |
| 5,210,855 | 5/1993 | Bartol | 395/500 |

OTHER PUBLICATIONS

IBM Technical Disclosure Bulletin, "Storage System Interface Protocol Optimized for Low Cost," vol. 30, No. 10, mar. 1988, pp. 15–16.
Wescon Technical Papers, "I/O Bottleneck for Microcomputers is Real and Solutions are Here," Oct. 1984, pp. 1–5.

*Primary Examiner*—Alyssa H. Bowler
*Assistant Examiner*—Alpesh M. Shah
*Attorney, Agent, or Firm*—Matthew J. Bussan; Roy W. Truelson; Joan Pennington

[57] ABSTRACT

A high performance data storage subsystem which is suitable for connection to a data processing system. The main functional units of the subsystem are (i) a host adapter, (ii) a device controller and (iii) at least one direct access storage device (DASD). The functional units are interconnected by dedicated, point to point, full duplex serial links over which commands and data are transmitted in the form of packets. The serial links also support packet multiplexing which allows commands transmitted over the serial link to be multiplexed with read or write data being transferred from and to the devices. A basic configuration of the subsystem comprises an adapter connected via a serial link to a controller which is in turn connected by four serial links to four DASDs. However the subsystem architecture described allows each adapter to be connected to up to four controllers, thus allowing a maximum of sixteen devices to be attached to one adapter.

11 Claims, 7 Drawing Sheets

DATA STORAGE SUBSYSTEM HAVING DEDICATED LINKS CONNECTING A HOST ADAPTER, CONTROLLER AND DIRECT ACCESS STORAGE DEVICES

This application is a continuation of application Ser. No. 07/938,056, filed as PCT/GB91/00254, Feb. 19, 1991, now abandoned.

TECHNICAL FIELD OF THE INVENTION

This invention relates to the field of data storage subsystems and more specifically to a high performance subsystem architecture.

BACKGROUND OF THE INVENTION

Data storage subsystems used in data processing systems commonly comprise a device controller connected to one or more storage devices on which customer data is retained. These storage devices are commonly direct access storage devices e.g. disk drives. In recent years, such storage subsystems have become more sophisticated and a number of different subsystem architectures have been proposed.

U.S. Pat. No. 4,825,406 (assigned to Digital Equipment Corporation) describes a secondary storage facility which employs serial communications between a device controller and attached disk drive. The serial link consists of four lines which are unidirectional bit serial channels. One of the lines carries write and command data to the drive, another carries read and response data from the drive to the controller. The remaining two lines carry signals for use in coordinating and synchronising transmissions. The device controller communicates with a host processor to which it is attached via a bus.

DISCLOSURE OF THE INVENTION

The invention provides a data storage subsystem comprising: a host adapter, a controller, a plurality of direct access storage devices, a dedicated serial link connecting the adapter t:o the controller, and a plurality of dedicated links connecting the controller to a respective device, the serial link consisting of a pair of inbound and outbound connections adapted to operate in full duplex mode.

It is preferred that the dedicated links between controller and devices are also serial links comprising a pair of inbound and outbound connections adapted to operate in full duplex mode.

It is further preferred that data and commands are transferred over a serial link in the form of packets, each of tile inbound and outbound connections of the serial link being adapted to allow multiplexing of said packets.

It is yet a further preference that the controller has a relatively large data buffer and the device has a relatively small data buffer. In designing the architecture of a data storage subsystem to allow limited buffering in the device has a benefit in terms of cost.

It is preferred that the controller data buffer is shared between the devices for reception of read data being transferred from the device to the host and for write data being transferred from tile host to the devices. Thus there is one area of buffer in the controller which is used for all data transfers between the host and the device.

It is also preferred that the controller is arranged to initiate transfer of data between itself and the device by means of multi sector device orders. The use of multisector orders has a performance benefit in that the controller does not need to instruct the device every sector. The controller is thus freer to carry out other tasks.

It is preferred that the adapter includes a plurality of direct memory access (DMA) channels for transferring data between the host and the dedicated serial link between adapter and controller and it is a further preference that the controller includes a direct memory access (DMA) controller which controls a plurality of DMA channels for transferring data between the adapter and the controller buffer or between the device and the controller buffer. The provision of DMA channels and controller allows the transfer of data to and from host memory without using a central processing unit.

A preferred embodiment of the invention will now be described by way of example only with reference to the accompanying drawings. It should be noted that not all the features present in the following description are necessary in order to put the claimed invention into effect.

DETAILED DESCRIPTION OF THE INVENTION

Figure 1:
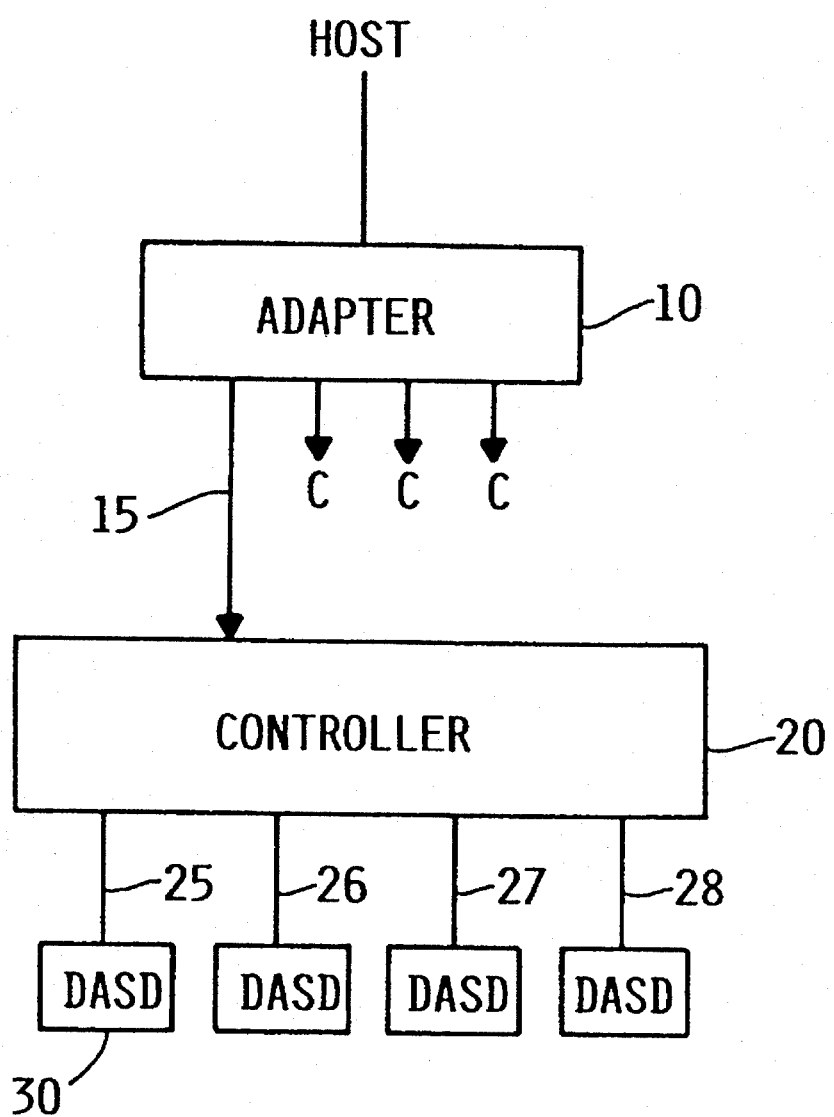
FIG. 1 is a block diagram of the major functional units of a data storage subsystem according to the present invention.

A data storage subsystem is described which is suitable for connection to a data processing system and provides large amounts of storage which may be accessed by the host system at high speed. The main functional units of the subsystem, shogun in FIG. 1, are (i) Host Adapter, (ii) Device Controller & (iii) Direct Access Storage Device (DASD). The functional units are interconnected by point to point, full duplex serial links. FIG. 1 shows a basic configuration of the subsystem wherein one adapter 10 is connected via a dedicated serial link 15 to one controller 20 which is in turn connected by four serial links 25–28 to four DASDs 30. The bulk of the following description will relate to this basic configuration. However the architecture of the subsystem (described in detail below) is designed to allow each adapter to be connected to up to four controllers, each of which may be connected to up to four devices. In addition the controller can be attched to up to two adapters. In a preferred embodiment of the subsystem the host adapter is housed in the host system and is connected via a serial link to a housing (e.g. rack mounted drawer or free standing unit) which comprises one controller and four DASDs with associated power supply and cooling system (not shown).

Firstly a brief description of the main functions of the adapter, controller and DASD is given.
1. ADAPTER The adapter is essentially a general purpose multiplexer that connects the host system to the controllers through the serial links. The adapter may be designed to attach to the host system through a variety of existing interfaces e.g. IBM's Micro Channel architecture. (Micro Channel is a trademark of International Business Machines Corporation)

The principal functions of the adapter are as follows:

1) The adapter fetches SCSI (Small Computer System Interface) commands by Direct Memory Access (DMA) from system memory and forwards them to the controller over the serial links.
2) The adapter manages a pool of DMA channels and allocates them on request to the controllers for the transfer of read/write data.
3) The adapter fetches packets of write data from host memory by DMA and transmits them on the serial links to the controllers.
4) The adapter receives packets of read data from the serial links and stores them in system memory by DMA.
5) The adapter assembles the ending status for each command and presents it to the system. Good status can be presented for up to 4 devices at a time.
6) The adapter provides the means to abort a previous SCSI command

2. CONTROLLER

The controller implements the SCSI command set (the members of which relevant to this description are defined elsewhere) for the attached DASD. Its principal functions are as follows:

1) The controller maintains a command queue for each DASD.
2) The controller has a data buffer (shared between the DASDs) to prefetch write data from the host system, to correct read data and to prefetch read data from the DASD.
3) The controller generates SCSI status.

3. DASD

The principal functions of the DASD are as follows:

1) The DASD seeks to the specified cylinder and head.
2) The DASD searches for the starting Logical Block Address (LBA) supplied by the controller and then it reads or writes the specified number of blocks, seeking to the next track as necessary. If any defective blocks are found the DASD skips over them automatically.
3) The DASD generates and checks the ECC bytes that are appended to each block. The ECC hardware is contained in the DASD to allow the controller to support a range of DASD that may lave different ECC algorithms.

If the DASD detects a data error then the controller requests the DASD to supply the error pattern and displacement. The controller will then correct the data in its buffer and restart the transfer to the adapter.

4) The DASD has a recording channel for read/write data. The write data is encoded, serialised and fed to the head. The read signal from the head is detected, deserialised and decoded.

SERIAL LINKS

The serial link provides point to point communication between two nodes of the subsystem i.e. between adapter & controller and between controller & DASD.

The unit of data transfer is a packet. The format of a packet is shown below and comprises a control field, an address field, a variable length data field and a CRC field.

| FLAG | CONTROL | ADDRESS | DATA | CRC | CRC | FLAG |

Packets may be multiplexed on the serial link to perform several commands on different DASDs simultaneously.

Figure 7:
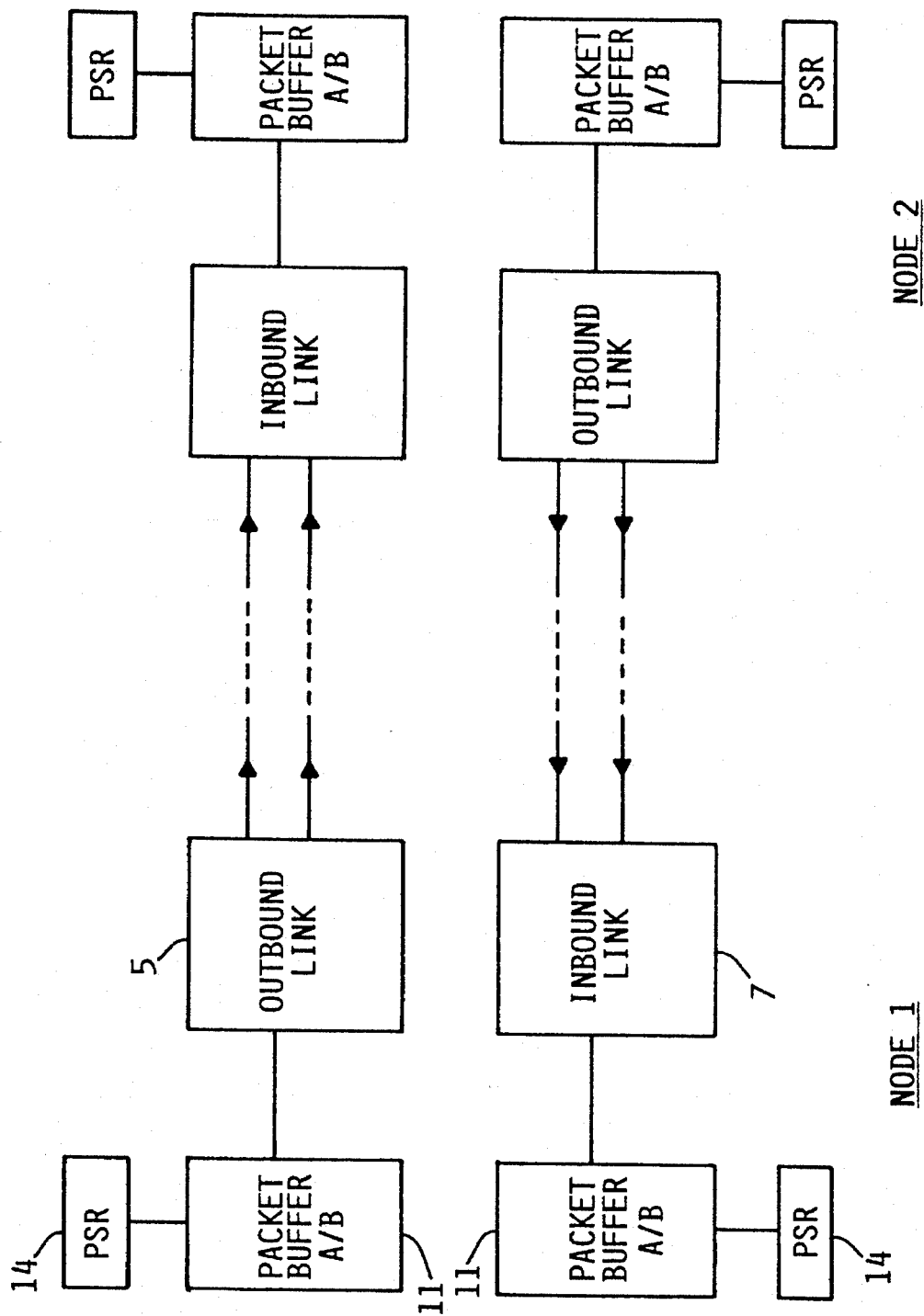
FIG. 7 is a block diagram showing the inbound and outbound serial links.

Full duplex data transmission supports the transfer of read data and write data simultaneously. In effect each serial link comprises two links providing data transfer in two opposite directions. This is shown in FIG. 7 in which each node has an inbound link on which it receives incoming data and messages and an outbound link over which it transmits data and messages.

The link has a simple protocol. Each node may transmit a packet on its outbound link subject to pacing responses and acknowledgements received from the remote node on its inbound link.

Packets on the serial link may be classified into two types.

Message packets originate from a software process in one node and are addressed to a process in the destination node. (A description of the processes is given below in the sections on Controller and Adapter operations). Message packets are typically used for commands and status (the different types of messages sent in a message packet are described in greater detail below).

Data packets originate from a DMA channel in one node and are addressed to a DMA channel in the destination node. Data packets normally contain read/write data.

Each packet contains an address field which indicates the source and/or destination of the packet. For more details of the operation of the serial links, reference should be made to pending UK patent applications 9026338.5 and 9026336.9.

MESSAGES

Messages are packets on the serial link that are addressed to a process in the destination node. The first data byte in the packet (that is the first byte in the data field of the packet) identifies the message. The subsequent bytes are the parameters.

Most messages carry a TAG as a parameter. This allows the messages to be associated with the corresponding command sent from the adapter.

Adapter to controller messages

SCSI_COMMAND

| MESSAGE CODE | TAG | | SCSI EXT | DASD ADDRESS |
|---|---|---|---|---|
| DMA ADDRESS (in host memory) ||||||
| COMMAND DESCRIPTOR BLOCK ||||||

This message transfers a SCSI Command Descriptor Block to the controller queue.

DASD ADDRESS identifies the target storage device that is to execute the command;

SCSI EXT provides an extension or modification beyond the function provided by the SCSI command set as described in ANSI specification 'Small Computer Systems Interface/2': X3T9.2/86-109. This portion of the message is set to enable Split Write to the DASD or to enable Split Read on the Adapter to Controller link;

DMA Address is the start address in the system memory of the data area for the SCSI command;

COMMAND DESCRIPTOR BLOCK (CDB) is the command descriptor block for the SCSI command. The CDB comprises one of the commands of the SCSI command set.

READY_FOR_READ

| MESSAGE CODE | TAG | LINK ADDRESS |
|---|---|---|

This message is sent by the adapter to the controller in response to a DATA_READY message. The Tag identifies the command with which the particular READY_FOR_READ message is associated. The Link address identifies the DMA channel allocated in the adapter for this read operation.

ABORT

| MESSAGE CODE | TAG 1 | TAG 2 |
|---|---|---|

This message is generated by the Adapter when executing the ABORT SCSI operation fetched from the host. TAG 1 identifies the mailbox containing the ABORT_SCSI Command operation; TAG 2 identifies the command to be aborted. Details of time mailboxes can be found later in the description. The message causes the controller to terminate execution of the command if it is in progress or to remove tile command from its queue if execution has not begun.

RESET

| MESSAGE CODE | TAG | Type | DASD ADDRESS |
|---|---|---|---|

This message is sent by the Adapter to tile Controller to reset selected resources within the controller or DASD.

Controller to Adapter messages
READY_FOR WRITE

| MESSAGE CODE | TAG | LINK ADDRESS |
|---|---|---|
| DMA START ADDRESS (in host memory) | | |
| DMA LENGTH (bytes) | | |

This message instructs the adapter to transfer data from the host at the DMA start address for the DMA length. LINK ADDRESS identifies the DMA channel in the controller to which the data packets are to be addressed. The Tag identifies the command with which the data is associated.

DATA_READY

| MESSAGE CODE | TAG |
|---|---|
| DMA START ADDRESS (in host memory) | |
| DATA LENGTH | |

This message instructs the adapter to allocate a DMA channel to this tag if it has not already done so and prime it for a transfer into host memory beginning at the specified start address and for the specified length. The Adapter responds with a READY_FOR_READ message telling the controller to which DMA channel the data packets should be addressed.

STATUS

| MESSAGE CODE | TAG | STATUS |
|---|---|---|

This message carries the SCSI status generated on completion of the command identified by the tag.

The major components of the controller and adapter will now be described.

Figure 2:
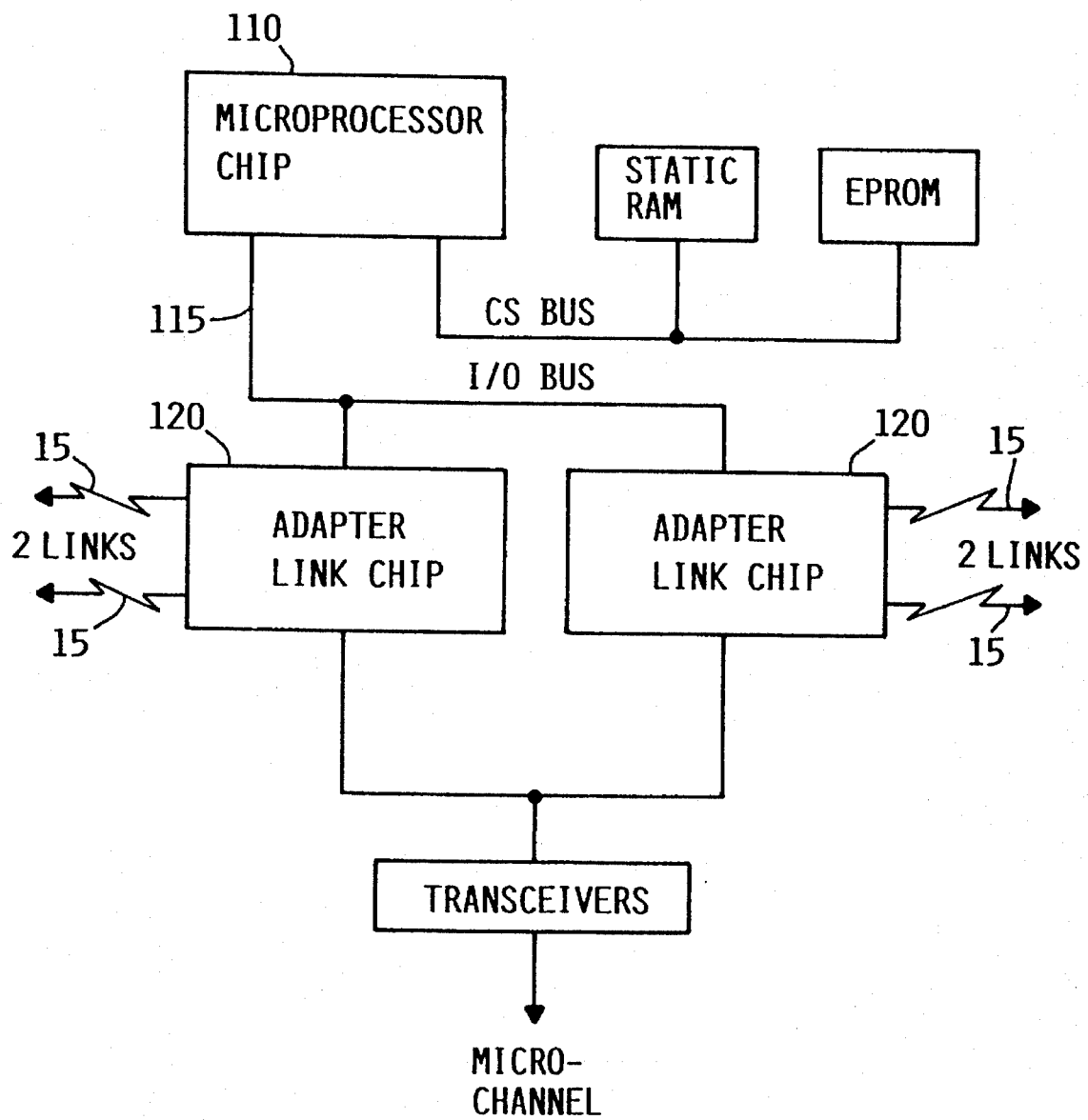
FIG. 2 is a block diagram showing the main components of the adapter of FIG. 1.

ADAPTER HARDWARE:

The main components of the Adapter hardware are shown in FIG. 2. The core of the adapter is the microprocessor chip (MPC) 110 which contains a high performance controller controlling the transfer of messages and data between the host system and the attached controller. There are also two identical adapter link chips (ALC) 120, each of which provides an interface to the Microchannel, two serial links and 16 DMA channels (not shown). Each serial link has four 128 byte packet buffers for commands, data and status in transit to and from the controllers. The interface between the MPC and the ALCs is an I/O bus 115.

Adapter Link Chip (ALC)

Figure 3:
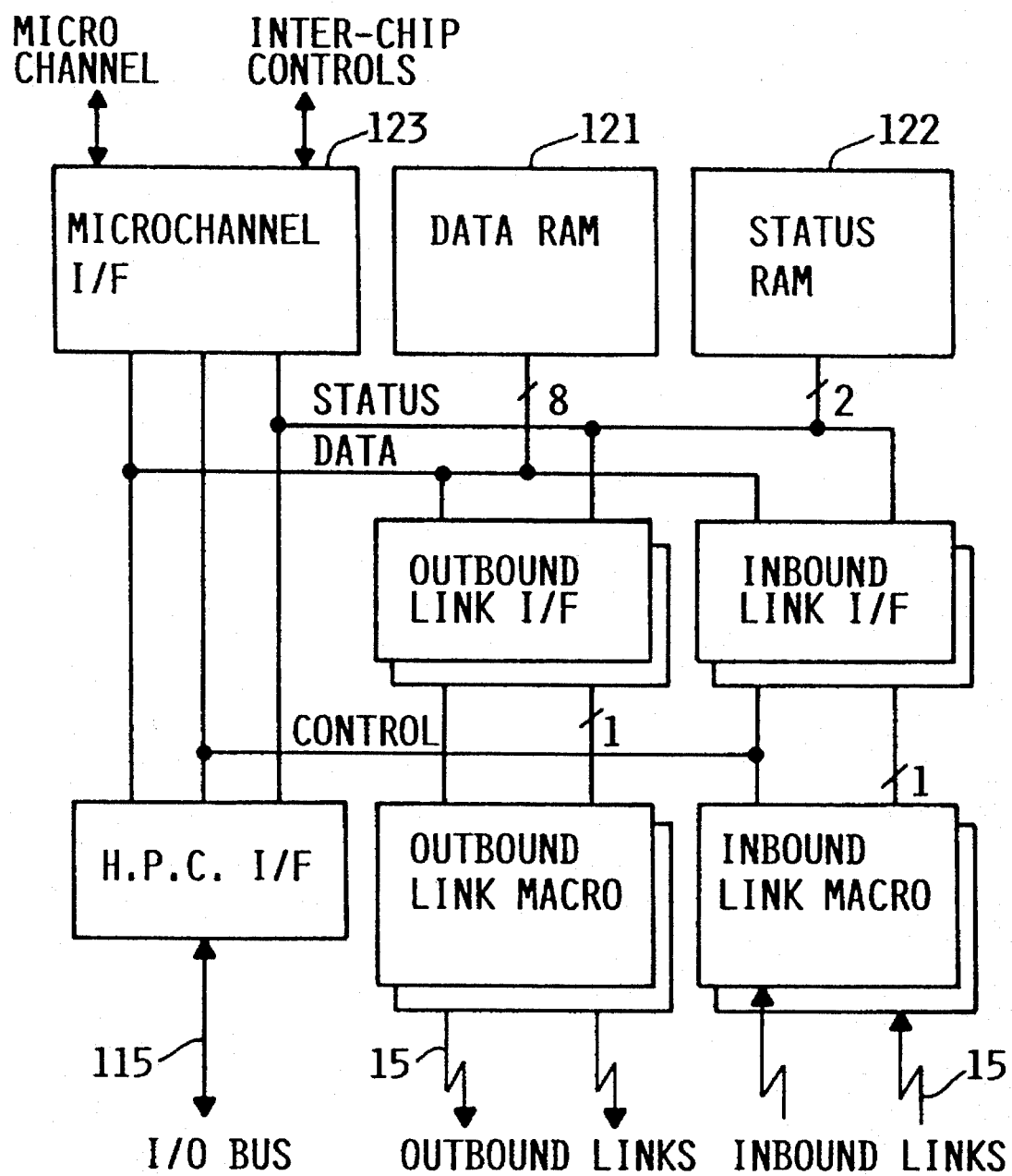
FIG. 3 shows the structure of the adapter link chip of FIG. 2.

The major components of the ALC are shown in FIG. 3.

Data RAM:

The Data Ram 121 contains the following areas:

1) Eight 128 byte packet buffers (four for each serial link: two outbound and two inbound);

2) Sixteen 8 byte DMA registers; one DMA register is provided for each DMA channel. The registers are used in DMA data transfer.

3) A 32 byte message buffer for outbound serial link messages: this buffer is used by the high performance microprocessor to build READY_FOR_READ messages destined for the controller. By setting the appropriate hardware, this buffer can then be transmitted to the controller.

4) Host-interface registers; Three interface registers are involved in the process of passing mailboxes to the adapter. Details of mailboxes and adapter operations are given later in the description.

Mailbox Pointer register: 4 Byte register that can be read and written by the system. It is initialised by the system to point to the first mailbox in the chain. The system is only allowed to write to this register when the current Tag Register is equal to the Last Tag register or immediately after the adapter has been reset.

Current Tag Register:

This is a 1 byte register that can only be read by the system. It allows the system to view the progress of the adapter. It is cleared by reset of the adapter and immediately after the host writes the Last Tag register. The adapter stores each mailbox tag in the Current Tag register after it completes the processing of a mailbox.

Last Tag Register:

1 Byte register that can be read and written by the system. It is written by the system when it adds some mailboxes to the queue. It indicates the tag which is in the last mailbox. By this means the adapter knows when it has reached the end of the list. When the register is written, the adapter is interrupted.

5) A 32 byte DMA packet buffer for fetching all mailboxes from host: SCSI_COMMAND, ABORT and RESET messages to the controller are sent directly from the DMA buffer. (READY_FOR READ message is built in the message buffer and sent over outbound link to the controller) The DMA buffer can be used to read or write from host memory under DMA control.

The data RAM is time multiplexed between the serial links, the Microchannel or inter-link transfers and the high performance microprocessor.

Status RAM:

The packet buffers each require a packet status register (PSR). These are held in the Status RAM 122 and are 16 bits wide. Packet buffers and associated Packet Status registers are shown in FIG. 7. Each register contains two fields:

DESTINATION—for outbound data packets this field contains a value which will be copied into the address field of the outgoing packet when the contents of the corresponding packet buffer are transmitted by the link. This value may be loaded automatically by hardware when the packet is being fetched from the packet buffer, in preparation for transmission. For inbound packets, this field contains an address extracted from the address field of the incoming packet. This value is written into the PSR by the inbound link FSM and its value is used to determine the subsequent routing of the packet.

BYTE COUNT—for outbound packets this contains a value which indicates the number of bytes which have been placed in the corresponding packet buffer. When the link transmits the packet, this value has to be copied into a byte counter (part of the link hardware) which is decremented as each data byte is sent. The value in the PSR is preserved in case the packet has to be retransmitted due to an error in transmission. For inbound packets, this field contains a value which indicates the number of data bytes which were received in the incoming packet.

Microchannel Interface

The Microchannel interfaces with host memory and employs the Data RAM host-interface registers defined above.

DMA Channels:

There are sixteen DMA channels (not shown) numbered 0–15 in each ALC. They are employed to DMA data between host memory and the DMA packet buffer.

CONTROLLER HARDWARE

Figure 4:
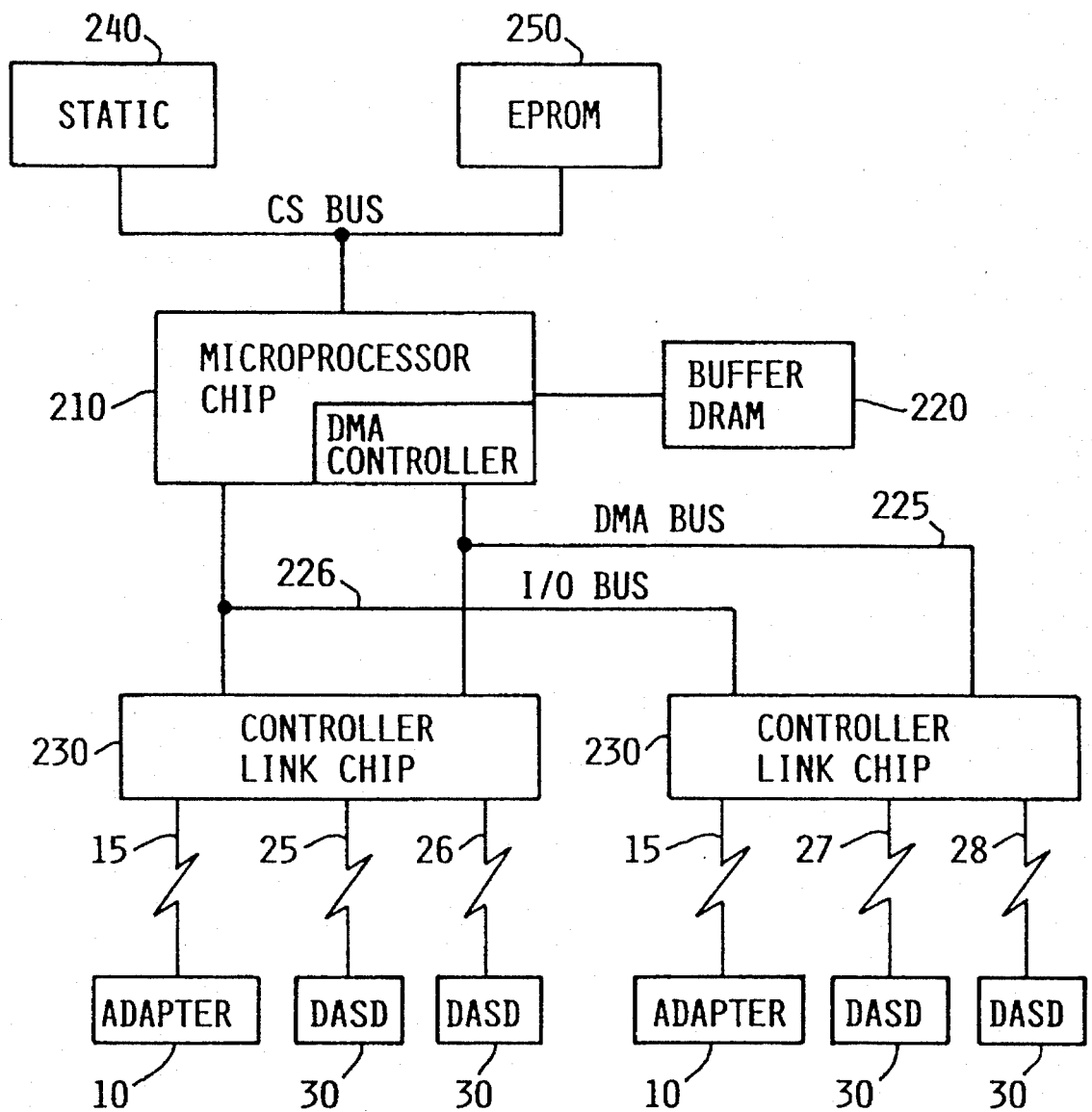
FIG. 4 is a block diagram showing the main components of the controller of FIG. 1.

FIG. 4 shows the main functional components of the controller. The core of the controller is the MFC chip 210 that contains the high performance controller (HPC) and a DMA controller which controls the transfer of data to and from the data buffer 220.

A DMA bus 225 connects the DMA controller to two Controller Link Chips 230.

Data Buffer 220:

All data between the adapter(s) and DASDs passes through the data buffer. The buffer is also used for storing read ahead data in case it is subsequently requested by the system (see section on READ AHEAD later in the description). Sixteen DMA channels (numbered 0–15) are provided for transfer of data between the link packet buffers and the data buffer. There are two channels per device (DA) link and 4 channels per SA link.

The data buffer consists of an array of DRAM modules. Data in this buffer is stored with ECC to ensure data integrity. The data buffer is allocated in seven 32K byte segments per DASD. If more than one task is executing on the DASD, a different segment is allocated for each task.

The high performance controller controls the interfaces to the controller via a series of external registers implemented in the Controller Link Chip. The I/O bus 226 is used by the microprocessor to access these registers.

Static RAM 240:

used for programme execution.

EPROM 250:

stores the microcode employed in the operation of high performance controller. The structure and operation of the microcode is described in more detail below.

Controller Link Chip (CLC)

Figure 5:
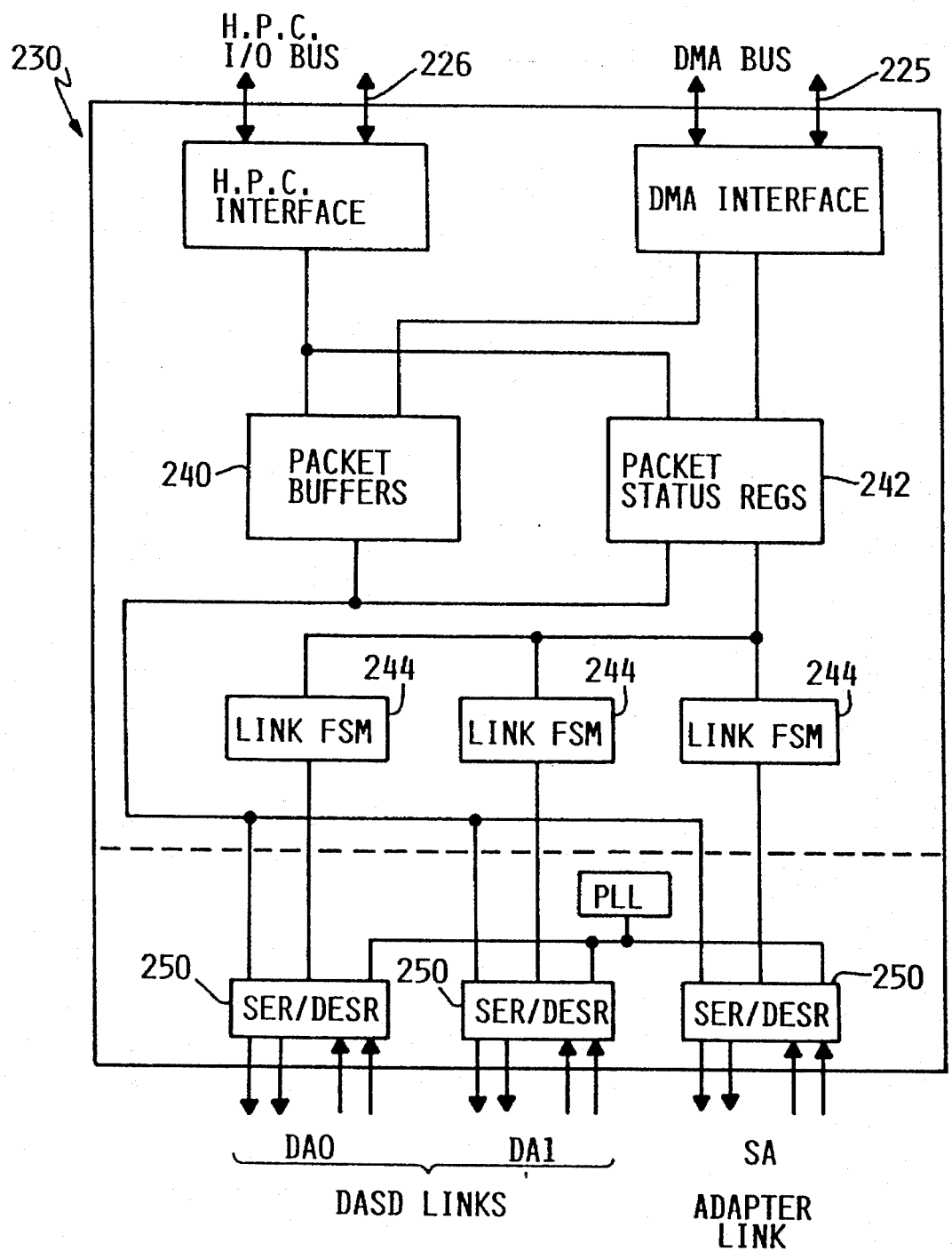
FIG. 5 is a block diagram showing the structure of the controller link chip of FIG. 4.

The main functional areas contained within a CLC are shown in FIG. 5. They are:

1) Two DASD serial interfaces (DA0 and DA1)

2) One adapter serial interface (SA)

3) Link Packet buffers 240 and associated packet status registers 242

Packet buffers are employed to hold incoming and outgoing data. In order to perform back to back link transfers an A/B buffer implementation is used. This allows the DMA logic to fill (or empty) buffer B whilst buffer A is being used by the link and vice versa. The full duplex nature of the link means that both inbound and outbound links need individual sets of packet buffers. Since the controller link chip contains three serial interfaces, this means that a total of 12 packet buffers are required to service the serial links. Additional packet buffers in which microcode can build outgoing Messages are also implemented (one per link). This allows the high performance microprocessor to construct messages without having to withdraw one of the A/B packet buffers from servicing DMA transfer hence preventing ongoing data transfers from being adversely affected.

Each of the three links in the CLC is provided with five packet buffers classified as outbound, inbound or message.

| | |
|---|---|
| OUTBOUND | Each link is provided with two A/B outbound packet buffers which are serviced by the DMA hardware. These buffers are filled with data obtained from the data buffer and sent to the DASD (DA links) or to the adapter (SA link). |
| INBOUND | Each link is also provided with two A/B inbound packet buffers. Incoming packets (from the adapter or the DASD) are stored in these buffers and they are serviced either by DMA hardware or Spinnaker, depending on the content of the address field in the incoming packet. |
| MESSAGE | Each link interface is also provided with a message packet buffer which is used by the microprocessor to build outbound messages to send to the adapter or the DASD. |

4) DMA Interface logic: this transfers data from the packet buffer to the controller data buffer under the supervision of the DMA controller.

DMA operations

Data is transferred between the adapter and the controller buffer and between the device and controller buffer by DMA. The controller microprocessor includes a DMA controller which coordinates transfer between the controller link chips and the shared data buffer.

The Controller Link Chip incorporates a DMA interface to transfer data between the packet buffers in the CLC and the controller data buffer. The DMA interface is supervised by the DMA controller contained within the microprocessor chip. The MP chip contains logic to arbitrate between DMA requests.

DMA transfers are preceded by an arbitration phase during which the CLC chips are allowed to signal requests for DMA channels which require servicing. The DMA controller issues a grant to one of these requests, after which point the CLC can initiate transfer. Each controller link chip can use 8 DMA channels to service data transfers. These DMA channels are assigned as follows;

Channel 0,1 : DA link no 0 (DA0 in FIG. 5)

Channel 2,3 : DA link no 1 (DA1 in FIG. 5)

Channels 4–7: Adapter Link (SA in FIG. 5)

(the second CLC uses channels 8 to 15 in the same order as above)

This arrangement allows up to 2 DMA channels to service each DASD and allows the adapter link to be serviced by up to 4 DMA channels. These channels can be used concurrently to exploit the packet multiplexing feature of the serial link. The device links are given priority over the adapter link. The DMA bus allows a data transfer rate of up to 40 MBytes/s. A 32 byte (DA) transfer from packet buffer to data buffer takes approximately 1.2 microseconds. A 128 byte (SA) transfer takes 3.6 microseconds.

During arbitration, each CLC raises requests on the DMA bus as follows:

STORES (writes to the buffer) A DMA request will be raised on receipt of an inbound link packet, provided that the address field of the packet indicates that the data was destined for a DMA channel.

FETCHES (reads from the buffer) A DMA request will be raised for a DMA channel if either one or both of its associated link packet buffers are empty.

DMA Store operation: DMA store operations are used to empty inbound packet buffers.

DMA Fetch operation: DMA fetch operations are used to fill outbound packet buffers. Each transfer will normally be for a complete packet buffer.

Command Descriptor Queues

The CDB's (plus ABORT and RESET) are stored in Command Descriptor Queue Entries under the control of the SA RECEIVE MESSAGE process when they are first received.

FREE queue:

Initially all CDQE's are free. The FREE queue is a queue only in that one member points to the next allowing all free CDQEs to be found. No significance in the order of entries.

NEW COMMAND queue:

when a new command arrives, the SA task copies it into the CDQE at the head of the free queue. The CDQE is removed from the free queue and added to the New Command queue. Abort messages are also put in a CDQE and added to the New Command queue.

DEVICE COMMAND Queue:

There are four device command queues—one for each device. Each queue is serviced by its own Command process. When the QUEUE MANAGER process finds a new command in a CDQE in the New Command queue, it finds the device to which it is addressed and transfers the CDQE to the corresponding Device Command queue.

MESSAGE Queue:

when command processing completes, its CDQE is loaded by the relevant Command process with a SCSI status message and transferred from the Device command queue. The Message queue is thus a queue of requests to the SA Transmit Message process.

The same queues are used for commands received via different Adapter links.

Queue Linkage:

The head and tail pointers for the Free, New Command and Message queues are fields in the Message Control Block (MCB). The head and tail pointers for the device command queues are in the corresponding Device Control Block (DCB). The head addresses the first member of the queue. The tail addresses the last member.

Each CDQE contains a 'Next' pointer. Although a CDQE may be in one of several queues it can never be in more than one at a time.

The operation of the adapter and controller will now be described.

ADAPTER
OPERATION

Figure 6:
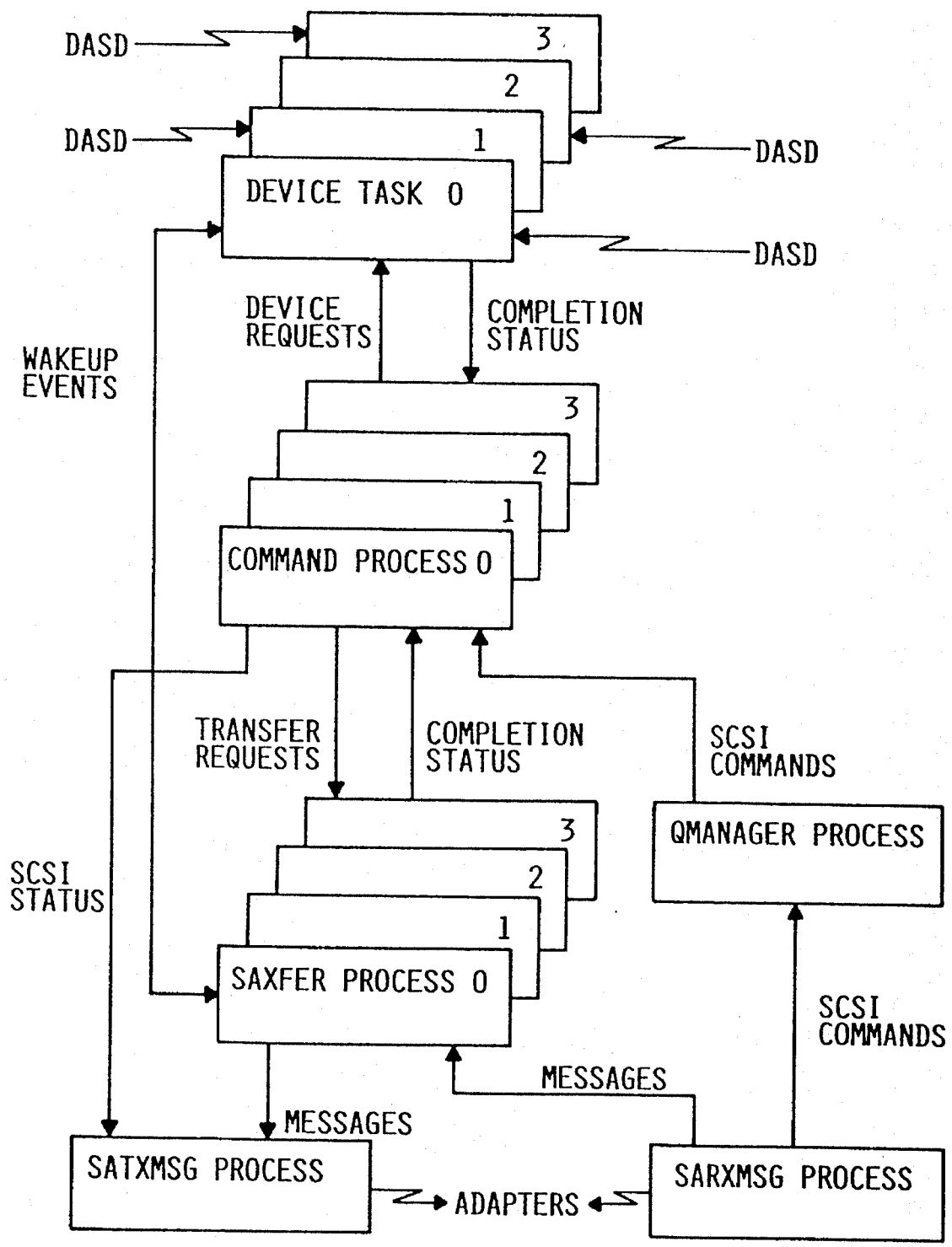
FIG. 6 is a block diagram showing the communication between tasks defined in the controller microprocessor.

Tasks defined within the high speed microprocessor control the operation of the adapter. Tasks are initiated by interrupts, which may be from a hardware event or via a software interrupt from another task. Software interrupts are the means where one task can set an interrupt to another. The communication between the different tasks is shown in FIG. 6.

Tasks

Status: the status task is responsible for managing status to be presented to the host system. Status is passed to this task from one of the other tasks and may be directly presented by writing-it to the hardware.

Link: there is one link task to handle the 4 serial links to the controllers. This task is responsible for interpreting any messages received from the controllers(s) and taking appropriate action.

Mailbox: this manages the mailbox interface from the host system. It is responsible for receiving each mailbox from the system. If the mailbox is SEND_SCSI Command, it will be passed to the link task for transmission to the appropriate controller.

(There are other tasks defined but are not described as not being directly relevant to this description).

When instructed by the host processor, the adapter fetches commands from host memory and forwards them immediately to the appropriate controller for execution. The mechanism for fetching commands is dependent on the architecture of the host system and will vary accordingly. In this description, the following mechanism is used on the Microchannel.

The host system initiates subsystem operations by means of Mailboxes which are built in host memory. Each mailbox contains a unique tag which identifies that particular command. For example, when the host wishes to initiate an operation in the subsystem, it will build the operation in the next available mailbox and write the Last Tag Register. Writing the Last Tag Register interrupts the MAILBOX task in the adapter microprocessor. The MAILBOX task instructs the adapter hardware to DMA the mailbox from host memory into the 32 byte DMA buffer to a designated one of the adapter link chips (master chip) to which all messages from the host are directed.

Once in the DMA buffer, the MAILBOX task decodes the mailbox to determine the type of operation defined by the mailbox contents and if it finds that it is a SEND_SCSI command, the mailbox is converted to a SCSI_COMMAND message for transmission to the appropriate controller. The SCSI_COMMAND message is sent from the 32 byte DMA buffer over the link in the data field of a message packet. The address field of the packet contains the address of the destination which in this case is the controller microprocessor. If the command is destined for a controller which is not serviced by the master chip, it is copied into the DMA buffer in the other ALC and sent over the serial link.

The host defines a number of different operations as well as the SEND_SCSI command, many of which are acted on by the adapter and do not require transmission to the controller. However, two operations namely ABORT_SCSI COMMAND and RESET are passed on to the appropriate controller in the form of ABORT and RESET messages. Details of the format of these messages were given in the list of Adapter-Controller messages earlier in the description.

ABORT_SCSI COMMAND and RESET operations are handled by the adapter in essentially the same way as the SEND_SCSI COMMAND operation. The MAILBOX task decodes the mailbox and sends the ABORT or RESET message from the DMA buffer to the appropriate controller.

Again, depending on which controller is addressed, it may be necessary to copy the message into the DMA buffer of the second ALC.

The adapter starts a timer for each command that it issues. This serves to detect lost commands or a hung controller without burdening the host system with a large number of timers. The Adapter Idle Task periodically updates the timer and checks that the operation has not timed out.

CONTROLLER OPERATION

Operation of the controller is achieved by means of tasks defined in microcode within the Spinnaker microprocessor. There are 8 tasks defined in this processor. These include:

- 4 Device (DA) tasks which manage the interface with the respective device.
- An SA task which manages the interface with the adapter/host.
- A Command Control Task which is the task with overall control. New SCSI commands are passed to it from SA task. It queues them, decodes them and sends instructions to SA task and appropriate device task. SA and DA tasks perform the data transfer.
- The controller uses the above tasks but the SA task and Command Control task are extended via the concept of subtasks. The controller has a number of processes which are implemented as an independent task or as a subtask within a task. Subtasks are run under the control of a subtask scheduler.
- FIG. 6 is a block diagram showing the communication between the different processes.
- Control blocks are used in this communication, one process enters information into control block and posts another process which accesses the information in the control block. Control Blocks are passed between processes.

Controler processes

SA RECEIVE MESSAGE (SARXMSG)

This process deals with all messages sent from the adapter to the controller i.e. SCSI_COMMAND, ABORT, RESET & READY_FOR READ. The format of these messages can be found elsewhere in this description). A message packet from the adapter is received ill the inbound packet buffer of the CLC. The contents of the address field of the incoming packet identify it as a message and it is serviced by the high performance controller. If the message is a new COMMAND, ABORT or RESET the SA Receive message process copies it into the Command Descriptor Queue Entry (CDQE) at the head of the free queue. The CDQE is then enqueued to the Queue Matlager process. If the message is READY_FOR READ it is passed to the appropriate SA XFER process (ie the process associated with the device which contains the data to be read).

QUEUE MANAGER

This process is a subtask of the Command Control Task and services interrupts from the SA RECEIVE MESSAGE process. Florinally, the message is a SCSI_COMMAND message. It may also be an ABORT or RESET. The SA RECEIVE MESSAGE Process has copied tile message into the CDQE and transferred the CDQE from the free queue to the 'New Command Queue' and then posted this process which then transfers the commands from the 'new command' queue to the device specific queue and posts the appropriate command process. The QUEUE MANAGER process carries some limited processing of the message in order to determine which COMMAND process should be posted.

COMMAND

The Command process (one of four subtasks of the command control task) processes the SCSI commands on the Device Command queues. There are four instances of the command process running in parallel, one for each of the four supported devices. Normally, each process handles commands addressed to its device.

Each Command process takes a command off its queue and:

- ensures that it is valid to execute at this time
- invokes a routine which handles the individual commands which:
- validates the command
- Instructs the SA XFER (SA) and DEVICE (DA) process
- Suspends until the SA and DA have completed
- Returns SCSI status
- Normally posts the SA TRANSMIT MESSAGE process to send SCSI status
- to the adapter.

This procedure is repeated for each command in the Device Queue until the queue is exhausted, then it suspends and is resumed when a new command is added to the queue by the QUEUE MANAGER process.

DEVICE

One process per device (implemented as separate tasks). The DA process handles the following requests from the COMMAND process:

1) Read:
   the appropriate routine is called to process Read command requested by the COMMAND process. The routine issues a SEEK order to the appropriate DASD, initialises the DMA i.e. allocates a DMA channel, calculates the buffer size available and if there is space available sets up and issues a READ order to the DASD which initiates transfer of data from the DASD to the data buffer in the controller. The DMA address is passed to the DASD in the READ order and is used in the address field of the incoming data packets to identify the destination of the data. When 2) Write:
   the routine issues a SEEK order if not already issued
   Extend Current Operation 4) Stop Event
   plus other more specialised commands e.g. Format ID's.

A COMMAND process communicates with a DEVICE process by posting one of these three events NEWREQ:
   signals to a device process that a new request is to be started EXTREQ:
   this event is used to extend a request STOP:
   signals to device process to stop all work currently in process On receiving a request from the COMMAND process, the DEVICE process will initiate the appropriate action to the DASD by sending the appropriate DASD order over the serial link.

DASD orders are low level read/write orders that are generated by the controller. The following orders are provided to allow the controller to read and write data. Each of the orders defined below are sent to the DASD over the serial link in the data field of a packet. All 'order' packets are addressed to the microprocessor in the DASD for execution or for distribution to other components of the DASD.

STOP_AND_SEEK order

| ORDER CODE | CYLINDER | HEAD |
|---|---|---|

This order instructs the DASD to terminate read-ahead (if active) and seek to a specified cylinder and head. Also, for a write command, the separate seek order allows the controller to initiate the seek as soon as it decodes the command and without waiting to receive the write data from the adapter. If the STOP order is issued before the DASD has completed a read or extended read order (status packet not returned), the DASD terminates the read operation immediately, starts a seek to the cylinder and head specified in the STOP_AND_SEEK order and returns a status packet for the terminated READ order. No Status packet is sent for the STOP order.

This order is also sent to the DASD on receipt of an ABORT_SCSI command message from the adapter. In this case no seek operation is initiated.

READ order

| ORDER CODE | ADDRESS | CYLINDER | HEAD | LBA | COUNT |
|---|---|---|---|---|---|

This order instructs the DASD to search for a particular Logical Block Address (LBA) and read a specified number of blocks. The parameters are as follows:

The physical cylinder and head for verifying the seek, the logical block address and a count of the number of blocks to be read in addition, the Address field contains the byte which is to be placed in the address field of any data packets which are returned as a result of this order.

The DASD sends the requested data to the controller and checks the ECC bytes at the end of each block. If the DASD encounters any blocks that are marked as defective then it skips over them automatically. Finally the DASD returns status to indicate whether any errors were detected.

CONDITIONAL_READ order

This order has the same format as tile READ order and invokes a seek operation to the selected cylinder and head address. The sector corresponding to the LBA contained in the order is located and as many records as are specified in the count field are read from the disk. The address field contains the byte that is placed in the Address field of any data packets which are returned as a result of this order. Note that the CONDITIONAL_READ order is issued by the controller only when the amount of read data requested by the host is larger than a selected amount. If the amount of data requested is small then the use of CONDITIONAL_READ is not warranted, This order enables split read operation, more details of which are given below.

WRITE order

This order instructs the DASD to search for a particular LBA and write a specified number of blocks. The parameters are the same as for a READ order (see above) except that the controller also supplies the data to be written. In addition there is no address field.

CONDITIONAL_WRITE order

The Conditional Write order has the same format as the WRITE order.

EXTEND order

| ORDER CODE | LBA | COUNT |
|---|---|---|

This order extends the operation of a preceding Read, Conditional_Read, Write or Conditional_Write order. The 'count' parameter specifies the number of individual sectors required to be read or written after the current order completes.

The LBA field defines the address of the first block to be read or written. This will be one more than the LBA of the last block to be read or written by the previous order if contiguous reading or writing is required. If the LBA field is not the first block after the last LBA of the previous order, the blocks in between these LBA definitions are skipped over and not read or written.

To be effective, the DASD must receive an EXTEND order before the previous order has completed. The controller uses EXTEND to perform a back to back write and to continue read ahead. These operations are described in more detail below.

When the entire operation is complete, the appropriate event will be posted back to the Command process.

SA XFER

Per device process which transfers data between host and a read or write buffer in the controller. The COMICAND process can issue the following commands to the SA XFER process:

Send Read Data

Get Write Data

Stop Current Transfer

The parameters required to carry out the data transfer are passed from the COMMAND process to the SA XFER process in a control block.

SA TRANSMIT (SATXMSG)

This process transmits messages (READY_FOR_WRITE, DATA_READY & STATUS) to the adapter on behalf of other processes. READY_FOR_WRITE & DATA_READY are passed to this process from the SA XFER process and STATUS messages are passed from the COMMAND process.

EXAMPLE READ AND WRITE OPERATIONS

Examples of typical Read and Write operations beginning with receipt of the command from host to presentation of completion status to the host will now be described.

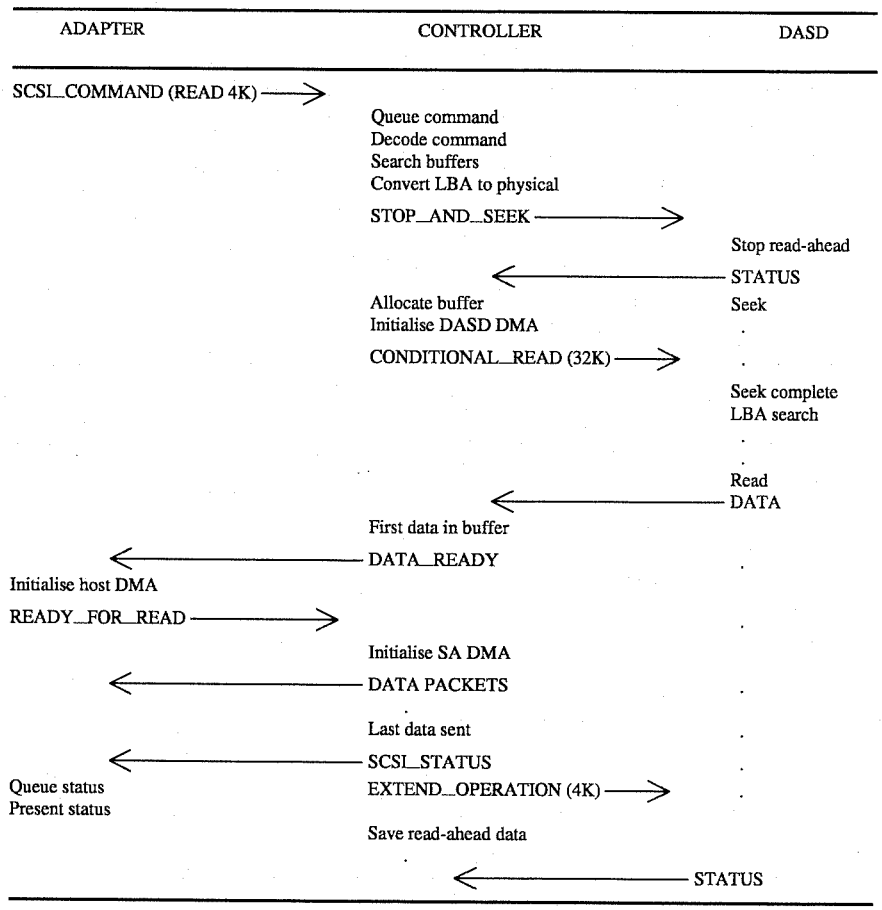

READ:

1. The Adapter sends a SCSI_COMMAND message including a READ operation in the CDB to the controller. The message includes the address of the DASD from which the read data is to be transferred and the address in host memory to which the data is to be so at.
2. The Controller processes the command as described above and passes control to the device task which sends a STOP_AND_SEEK order to the DASD. This terminates any currently active Read Ahead operation. (If no read ahead is currently active, this order is not sent).
3. The DASD returns STATUS to the control let, indicating the status of the terminated Read Ahead operation and then begins the seek to the specified head and cylinder.
4. The controller device task allocates a 32K segment of the data buffer for the read data that is to be transferred. The device task also allocates a DMA channel over which the data is to be transferred to the controller data buffer.
5. In this example the device task then sends a CONDITIONAL_READ order to the DASD including the address of the allocated DMA channel, the data start address and the number of blocks to be transferred. As mentioned previously if the amount of requested data is small a 'normal' READ order rather than a CONDITIONAL_READ order will be sent.
6. On receipt of the CONDITIONAL_READ order the DASD searches for the LBA and begins transfer of the data. The address field of the data packet(s) contains the address of the DMA channel.
7. The read data is transferred to the controller via the serial link and into the allocated space in the controller data buffer.
8. The Controller sends a DATA_READY message to the adapter which causes the host to initialise the host DMA channel via which the read data is to be transferred between controller and host memory. Although the above flow diagram shows transmission of the DATA_READY message after receipt of the first data into the buffer, it will be more commonly the case that the message is sent before any data is received in the buffer. The purpose of this message is to initialise host DMA ie to prepare the host for receipt of data.
9. The adapter sends a READY_FOR_READ message to the controller in response to the DATA_READY message. The READY_FOR_READ message, which identifies the DMA channel initialised in the host, is received by the controller SA RECEIVE message process and passed to the SA XFER process which initialises the SA DMA ie allocates a DMA channel over which data will be transferred from the data buffer.
10. As data is received in the data buffer from the DASD it is transferred over the serial link into host memory. When the last data is sent, the controller returns SCSI_STATUS to the adapter which queues the status and presents it to the host.

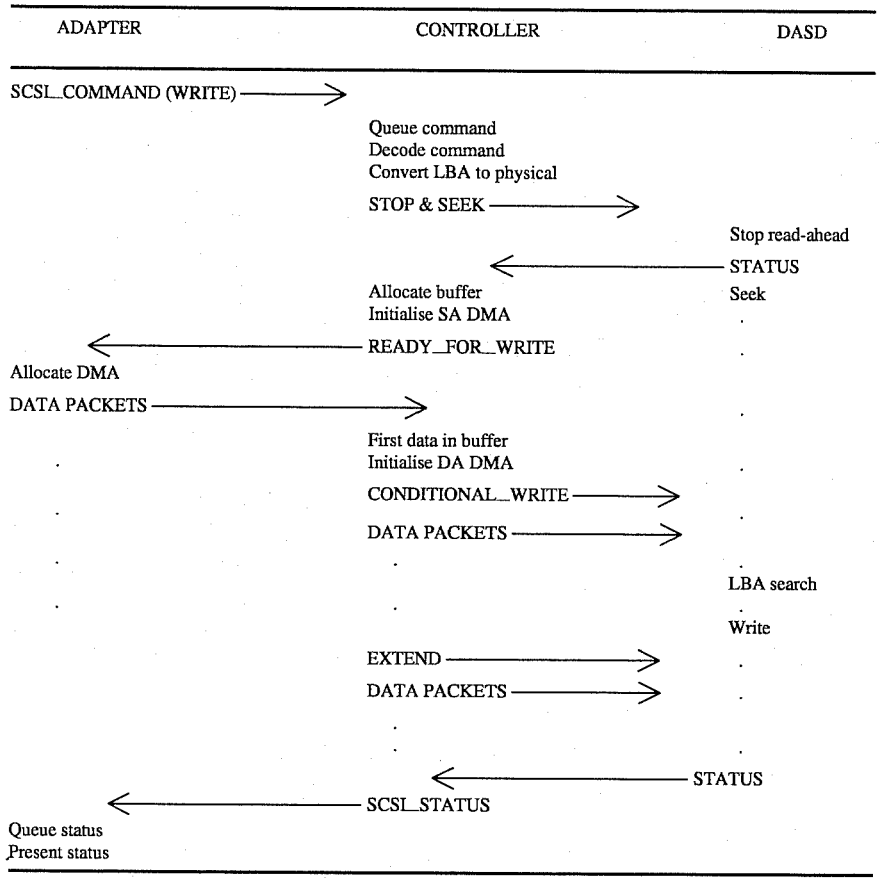

WRITE:
1. The adapter sends a SCSI_COMMAND message defining a write operation to the controller.
2. The controller processes the command (as described earlier) and control is passed to the DEVICE process from the COMMAND process. In this example, the DEVICE process sends a STOP_AND_SEEK order to the DASD (read ahead operation is currently active).
3. The DASD stops read ahead and sends status to the controller indicating the status of the read ahead operation just terminated. The DASD begins seeking to the cylinder and head specified in the STOP_AND SEEK order.
4. The controller SA XFER process allocates space in the data buffer and initialises the SA DMA channel to which the packets of write data from the host are to be addressed.
5. The SA XFER process posts the SA TRANSMIT process which transmits a READY_FOR_WRITE message to the adapter. This message identifies the DMA channel initialised in the last step.
6. The adapter LINK task allocates a DMA channel which is to be employed to transfer data to host memory and then begins transmission of packets of write data to the controller.
7. The controller DEVICE task initialises a DMA channel to be used for transfer of data between the data buffer and the DASD and in this example sends a CONDITIONAL_WRITE order to the DASD identifying the LBA and amount of write data which the DASD is to expect:. The DASD begins the LBA search.
8. As the write data is received over one DMA channel to the buffer it is transferred out of the buffer over a second DMA channel and via the serial link to the DASD.

READ AHEAD

Read Ahead is a function provided by the controller to improve the performance of a set of READ commands which together constitute a long sequential read. This is achieved by continuing reading from the DASD into the controller's buffer in anticipation of the next read as follows:

A SCSI READ command causes the controller to instruct the DASD to transfer the required number of sectors into the 32K segment of the controller's data buffer that has been allocated to this read. In the described embodiment, the controller will normally request 32K of data (i.e. the amount of data to fill the allocated buffer space) even when the command from host requests a lesser amount. As the data requested by the host arrives from the DASD it is transferred to the host. When the transfer of the required data up to host is complete, status is generated by the controller. Meanwhile the transfer of the read ahead data continues.

If the READ order to the DASD specified a larger amount of data than that requested by the host, the extra data will be stored in the controller buffer. As the host makes buffer space available, the data transfer is extended by an EXTEND order sent by the controller to the DASD. On receipt of the EXTEND order, the DASD transfers the sectors specified in the EXTEND order to the new end of the buffer.

As an example, if the READ command sent by the adapter requests 4k of data (8 sectors) and the controller requests the device for 32K, then as soon as the required 4 k of data is transferred up to host there will be 4K of space in the buffer.

The controller sends an EXTEND order to the device requesting 4K of new data to fill the buffer.

On receipt of the next READ command from the adapter, the controller examines the buffer to see whether it already has the required data (or is about to have). If so it transfers that to tile host. If not, it instructs the DASD for the new read, terminating any active read ahead.

The Read Ahead continues until the DASD is reinstructed for a new transfer or when the Read Ahead buffer

BACK TO BACK WRITES

Back to back writes are connective write commands writing consecutive blocks. The first block of a subsequent write immediately follows the last block of the previous write. Special support for back to back writes in the controller and the DASD allow the writes to be effected without the DASD taking the revolution between the commands which would otherwise be required.

When the command specific routine for the WRITE command reaches a point where it could extend its currently active device transfer to include a following consecutive write, it 'looks over its shoulder' and checks whether the following CDQE contains such a write. If it does, it issues an Extend Request to the device task which sends an EXTEND order to the DASD. If the DASD receives the EXTEND order before the preceding write is finished, it simply extends the count of the current write by the amount specified by the Count parameter in the EXTEND order.

If the EXTEND order reached the DASD too late, the DASD presents status after the first write in the normal way and rejects the EXTEND order with a 'Missed' status. The controller then generates a normal write. EXTEND orders are themselves candidates for extension.

EXAMPLE

Host sends SCSI write command for sectors 0–7

Controller issues WRITE order for sectors 0–7

Host sends SCSI write command for sectors 8–15

Controller detects back-to-back write in queue

Controller issues EXTEND order for 8 sectors

If EXTEND order arrives before the end of the WRITE, the DASD extends its current block count by 8 and does not return status after sector 7. Instead it returns status after sector 15.

If the EXTEND order arrives too late, the DASD generates normal status for the WRITE order and tells controller that EXTEND order was received too late. The Controller then reissues a WRITE order for sectors 8–15. Sectors 8–15 are then written on the next revolution.

Note that the implementation of back to back writes using the EXTEND order employs the packet multiplexing feature of the serial link i.e, the controller has to be able to send the EXTEND order over the Serial link at the same time as it is transmitting the write data to the DASD.

SPLIT READ

Split Read is a performance enhancement gained by starting reading from the DASD at the first sector, within the range of the current READ operation, which appears under the head, as opposed to the first sector of the range. For example, a read for sectors 4,5,6 ... 15,16 might be read in the order 6,7,8, ... 15,16,4,5 if the head happened to arrive too late to read sector 4 but early enough to read sector 6. Thus, the transfer from the DASD would complete 11 sectors (i.e 16 minus 5) earlier than would otherwise be the case.

The optimisation is achieved by the controller instructing the DASD to read the first sector. If the DASD then finds that the sector is more than a certain time away (1 millisecond for example), it aborts the read and returns the current LBA to the controller. The controller then makes the decision whether to reissue the same read, or to split it into a 'tail' read which transfers from the current sector to the end, followed by a 'head' read which transfers from the first sector to the start of the tail.

To support this, the CONDITIONAL READ order to the DASD, which is aborted if there is a long delay to the first sector, is available. The data arrives in the controller buffer, in the above example, 11 sectors earlier than it would if the read had been done in the normal order. However if the controller then has to rearrange the data to be sent to the host in the normal order, then the performance benefit of split read operations is greatly reduced.

The technique described herein realises more of the potential of 'split reads' by avoiding the need to reorder the data in the controller buffer. This is achieved by defining the message interface between the controller and the adapter to allow the controller the necessary control over the host DHA addresses. In effect the controller has random access to host memory. The DATA_READY message sent from the controller to the adapter when data is placed into the controller data buffer specifies the address in host memory to which the data should be directed. When a split read operation is in progress, the controller calculates an amended start address from the address sent in the initial command from the host and sends this to the host in the DATA_READY message. For the example given above, the controller is told the start address for sector 4 and is thus able to calculate the amended address in host where the first sector of the split read data (in this case sector 6) should be directed. If sectors 6 to 16 are already in the data buffer, then the controller will issue a single DATA_READY message to initiate transfer of sectors 6 to 16. The transfer of sectors 6 to 16 will complete. When the controller has sectors 1 to 5 in its buffer, it will then issue a DATA_READY message to the controller indicating readiness to transfer sectors 1 to 5 and the address in host memory to which sector 1 is to be directed.

RAW READ

The controller's ability to randomly access areas of the host memory to control the host address also facilitates another performance benefit. During any read operation when the DASD is in the process of transferring multiple sectors of data to the controller buffer, the DASD doesn't wait to the end of a sector (51.2 bytes) to check the ECC before sending the sector up to the host. In the system described, the DASD doesn't have sufficient buffering to store a sector's worth of data. The data is read serially from the disk and compiled into 128 byte packets for transmission to the the controller. At the end of the sector, the device checks the ECC and appends 6 ECC bytes to the end of the data. If all the data in the sector was 'good', no error will be indicated and the controller will continue transmission to host. It should be noted that in this system, most of the sector of data will have already been transferred from the controller to the host before the device sends the last packet of data to the controller and therefore before the device is aware of any errors contained in the data. Thus the data already in the host will be 'raw' data ie there was no checking before transfer to the host.

For most data transfers, the raw data will also be good data i.e. the data is transferred from the device. Transfer of data directly to host without checking provides a performance benefit over prior systems in which each sector is checked any of the sector is transmitted to the host. The time taken for multiple sectors of data to be received by the host is reduced in the direct case by approximately the time taken for one sector of data to travel from device to host. In high performance systems such as described herein, this benefit can reduce the overall overhead by a significant amount.

As described, for most data transfers the sending of raw data as opposed to checked data results in a performance benefit. To be traded against this is the reduced performance when there is an error in the transferred data. In one prior system, if there is an error in the raw data, the whole of the data must be retransmitted. In the present invention wherein the controller has random access to host memory, there is no need to retransmit all the data.

If, at the end of a sector, the DASD detects the presence of an error in that data, the ECC bytes indicate this to the controller which is alerted. When it has completed sending the current packet of data to the host, the controller ceases transmission and sends a DATA_RETRY message to the host. The controller requests retransmission of the sector which contained the error. The DASD retransmits the requested sector in 128 byte packets to the controller which stores the data in its buffer. If the retransmitted block of data is good, the controller passes the data up to the host.

The controller sends a DATA_RETRY message to the adapter which specifies the address in host memory to which the retry data is to be directed. The DATA_RETRY message instructs the adapter to set up a new DMA channel over which the data is to be transferred into host memory. The adapter responds to the DATA_RETRY message with a READY_FOR_READ message. The DATA_RETRY message indicates the amount of data which is being retried.

If the retry data sent to the controller is still in error, the controller will re-request the data a number of times. If, after a predetermined number of attempts, the controller still hasn't received good data, it will attempt to correct the error in the data held in its buffer. To this end, it sends 'Operate on ECC' order to the device, which causes the device to calculate which bytes were in error and also the correct data for those bytes. The number of bytes which may be corrected is implementation dependent; in the described system tile number is two. The device sends the correction information to the controller which corrects the data held in its buffer. The controller now sends the block of data including the corrected bytes to the host.

We claim:

1. A data storage subsystem for a host system, comprising:

a host adapter for transferring data to and from the host system;

a controller connected to the host adapter via a dedicated serial link;

a plurality of direct access storage devices;

said dedicated serial link connecting the host adapter to the controller comprising a pair of inbound and outbound connections and means for operating the inbound and outbound connections in full duplex mode wherein data is transferred simultaneously over the inbound and outbound connections;

a plurality of dedicated links each connecting the controller to a respective direct access storage device;

wherein the dedicated links between the controller and the direct access storage devices are also serial links, each dedicated link comprising a respective pair of inbound and outbound connections and means for operating the respective pair of inbound and outbound connections in full duplex mode wherein data is transferred simultaneously over the respective pair of inbound and outbound connections;

wherein data and commands are transferred over a serial link in packets, the serial link further comprising means for multiplexing said packets; and said controller having a data buffer and each direct access storage device having a data buffer, the controller data buffer being large relative the data buffer of each direct access storage device the controller data buffer being shared between the direct access storage devices for reception of read data being transferred from the direct access storage devices to the host system and for write data being transferred from the host system to the direct access storage devices.

2. A data storage subsystem as claimed in claim 1, the controller including means for initiating transfer of data between the controller and each direct access storage device by multi-sector device orders.

3. A data storage subsystem as claimed in claim 1, the host adapter including a plurality of direct memory access (DMA) channels for transferring data between the host system and the dedicated serial link between the host adapter and the controller.

4. A data storage subsystem as claimed in claim 3, the controller including a buffer and a direct memory access controller controlling a plurality of DMA channels for transferring data between the host adapter and the controller buffer or between the direct access storage device and the controller buffer.

5. A data storage subsystem as claimed in claim 1, wherein the host adapter is connected by a plurality of dedicated serial links to a plurality of controllers.

6. A data storage subsystem as claimed in claim 1, wherein the controller is connected by at least two dedicated serial links to at least two adapters.

7. A data storage subsystem as claimed in claim 1, wherein data and commands are transferred over a serial link in packets, the serial link further comprising means for multiplexing said packets.

8. A data storage subsystem as claimed in claim 1, the controller including means for initiating transfer of data between the controller and each direct access storage device by multi sector device orders.

9. A data storage subsystem as claimed in claim 1, the host adapter including a plurality of direct memory access (DMA) channels for transferring data between the host system and the dedicated serial link between the host adapter and the controller.

10. A data storage subsystem as claimed in claim 9, the controller including a buffer and a direct memory access controller controlling a plurality of DMA channels for transferring data between the host adapter and the controller buffer or between the direct access storage and device the controller buffer.

11. A data storage subsystem as claimed in claim 1, wherein the controller is connected by at least two dedicated serial links to at least two adapters.

* * * * *